United States Patent
Hashimoto et al.

(10) Patent No.: US 12,484,807 B2
(45) Date of Patent: Dec. 2, 2025

(54) WEARABLE SENSOR, PERSPIRATION ANALYSIS DEVICE AND METHOD

(71) Applicant: NTT, Inc., Tokyo (JP)

(72) Inventors: Yuki Hashimoto, Tokyo (JP); Takako Ishihara, Tokyo (JP); Kei Kuwabara, Tokyo (JP)

(73) Assignee: NTT, INC., Tokyo (JP)

( * ) Notice: Subject to any disclaimer, the term of this patent is extended or adjusted under 35 U.S.C. 154(b) by 950 days.

(21) Appl. No.: 17/635,888

(22) PCT Filed: Aug. 28, 2019

(86) PCT No.: PCT/JP2019/033727
§ 371 (c)(1),
(2) Date: Feb. 16, 2022

(87) PCT Pub. No.: WO2021/038758
PCT Pub. Date: Mar. 4, 2021

(65) Prior Publication Data
US 2022/0287599 A1     Sep. 15, 2022

(51) Int. Cl.
*A61B 5/145*     (2006.01)
*A61B 5/00*     (2006.01)

(52) U.S. Cl.
CPC ......... *A61B 5/14517* (2013.01); *A61B 5/486* (2013.01); *A61B 5/6801* (2013.01)

(58) Field of Classification Search
None
See application file for complete search history.

(56) References Cited

U.S. PATENT DOCUMENTS

| 10,105,080 B1* | 10/2018 | Kam ............... A61B 5/14514 |
| 2010/0234711 A1 | 9/2010 | Sugenoya et al. |
| 2017/0100102 A1* | 4/2017 | Heikenfeld ........ A61B 5/14521 |

(Continued)

FOREIGN PATENT DOCUMENTS

| JP | 2018023665 A | 2/2018 |
| WO | 2009060824 A1 | 5/2009 |
| WO | 2019060689 A1 | 3/2019 |

OTHER PUBLICATIONS

Francis et al. "Digital nanoliter to milliliter flow rate sensor with in vivo demonstration for continuous sweat rate measurement," Lab on a Chip, Royal Society of Chemistry, 2019, vol. 19, pp. 178-185.

(Continued)

*Primary Examiner* — Benjamin S Melhus
(74) *Attorney, Agent, or Firm* — Slater Matsil, LLP

(57) ABSTRACT

A wearable sensor includes: a base member that has a through hole serving as a flow path of liquid and a recess connecting with an end portion of the through hole on an outlet side; a water absorbing structure disposed on a surface of the base member on the outlet side to come into contact with the liquid flowing into the recess from an opening of the through hole on the outlet side; a laser diode that radiates light toward the liquid flowing into the recess from the opening of the through hole on the outlet side; and a photodiode that receives light from the laser diode transmitted through the liquid or light reflected by the liquid. An amount of perspiration of a wearer of the wearable sensor is calculated based on light receiving characteristics of the photodiode.

4 Claims, 12 Drawing Sheets

(56) References Cited

U.S. PATENT DOCUMENTS

| 2017/0238854 A1* | 8/2017 | Henshaw | A61B 5/7282 |
| 2018/0235521 A1 | 8/2018 | Heikenfeld | |
| 2019/0231236 A1* | 8/2019 | Heikenfeld | C12Q 1/006 |
| 2020/0298231 A1* | 9/2020 | Francis | A61B 5/14532 |
| 2022/0015688 A1* | 1/2022 | Larson | A61B 5/1468 |

OTHER PUBLICATIONS

Tsuruoka et al. "Development of Small Sweating Rate Meters and Sweating Rate Measurement during mental Stress Load and Heat Load," Transactions of Japanese Society for Medical and Biological Engineering, vol. 54, No. 5, 2016, pp. 207-217.

* cited by examiner

WEARABLE SENSOR, PERSPIRATION ANALYSIS DEVICE AND METHOD

CROSS-REFERENCE TO RELATED APPLICATIONS

This application is a national phase entry of PCT Application No. PCT/JP2019/033727, filed on Aug. 28, 2019, which application is hereby incorporated herein by reference.

TECHNICAL FIELD

The present invention relates to a wearable sensor for measuring an amount of perspiration, a perspiration analysis device, and a perspiration analysis method.

BACKGROUND

The human body has tissues that perform electrical activities such as muscles and nerves, and in order to keep these tissues operating normally, it is provided with a mechanism that keeps a concentration of electrolytes in the body constant mainly due to actions of the autonomic nervous system and the endocrine system. For example, when a large amount of water in the body is lost as a result of perspiration due to long-term exposure to a hot environment, excessive exercise, or the like and the concentration of electrolytes in the body deviates from normal values, various symptoms such as heat stroke will occur.

For that reason, monitoring an amount of perspiration can be considered to be one of beneficial methods for ascertaining a dehydrated state of the human body.

As a typical method for measuring an amount of perspiration, there is a method for measuring a change in an amount of water vapor during perspiration (see NPL 1). In the method disclosed in NPL 1, an amount of perspiration is estimated based on a difference in humidity with respect to the outside air, and thus the perspiration needs to be vaporized by forced convection using an air pump. In such a method using an air pump, when measurement using a wearable form that a person can wear is considered, the air pump occupies a relatively large volume, and thus there is a problem in reducing the overall size of a device.

CITATION LIST

Non Patent Literature

NPL 1: Noriko Tsuruoka, Takahiro Kono, Tadao Matsunaga, Ryoichi Nagatomi, Yoichi Haga, "Development of Small Sweating Rate Meters and Sweating Rate Measurement during Mental Stress Load and Heat Load", Transactions of Japanese Society for Medical and Biological Engineering, Vol. 54, No. 5, pp. 207-217, 2016.

SUMMARY

Technical Problem

Embodiments of the present invention have been made to solve the above problems, and an object thereof is to provide a wearable sensor, a perspiration analysis device, and a perspiration analysis method in which an amount of perspiration can be measured without using an air pump.

Means for Solving the Problem

A wearable sensor of embodiments of the present invention includes: a base member that has a through hole serving as a flow path of liquid and a first recess connecting with an end portion of the through hole on an outlet side; a water absorbing structure disposed on a surface of the base member on the outlet side to come into contact with the liquid flowing into the first recess from an opening of the through hole on the outlet side; a light emitting element configured to radiate light toward the liquid flowing into the first recess from the opening of the through hole on the outlet side; and a light receiving element configured to receive light from the light emitting element transmitted through the liquid or light reflected by the liquid.

Further, a perspiration analysis device of embodiments of the present invention includes the wearable sensor, and a perspiration amount calculation unit configured to calculate an amount of perspiration of a wearer of the wearable sensor based on light receiving characteristics of the light receiving element.

Also, a perspiration analysis device of embodiments of the present invention includes the wearable sensor, and a component concentration calculation unit configured to calculate a concentration of an analysis target component in perspiration of a wearer of the wearable sensor based on light receiving characteristics of the light receiving element.

Further, a perspiration analysis method of embodiments of the present invention includes: radiating light from a light emitting element toward perspiration flowing into a recess from an opening of a through hole on an outlet side thereof when a wearable sensor is attached to a body of a wearer, the wearable sensor including a base member that has the through hole serving as a flow path of the perspiration and the recess connecting with an end portion of the through hole on the outlet side, and a water absorbing structure disposed on a surface of the base member on the outlet side to come into contact with the perspiration flowing into the recess from the opening of the through hole on the outlet side; receiving the light from the light emitting element transmitted through the perspiration or the light reflected by the perspiration; and calculating an amount of perspiration of the wearer of the wearable sensor based on light receiving characteristics of the light receiving element.

Effects of Embodiments of the Invention

According to embodiments of the present invention, it is possible to measure an amount of liquid flowing into the through hole without using an air pump. Thus, in embodiments of the present invention, when the wearable sensor is attached to the wearer's body, the amount of perspiration of the wearer can be measured without using an air pump. In embodiments of the present invention, an air pump is not required, and thus a device can be miniaturized.

DETAILED DESCRIPTION OF ILLUSTRATIVE EMBODIMENTS

Principles of embodiments of the Invention

Unlike the method disclosed in NPL 1, embodiments of the present invention are characterized in that an air pump is not required, perspiration is sampled in a liquid state, and an amount of perspiration is measured from a time-series change in an amount of received light when electromagnetic waves are incident on the sampled perspiration. In addition, it is also possible to analyze a concentration of electrolyte components contained in the perspiration from the amount of received light.

Embodiments

Figure 1:
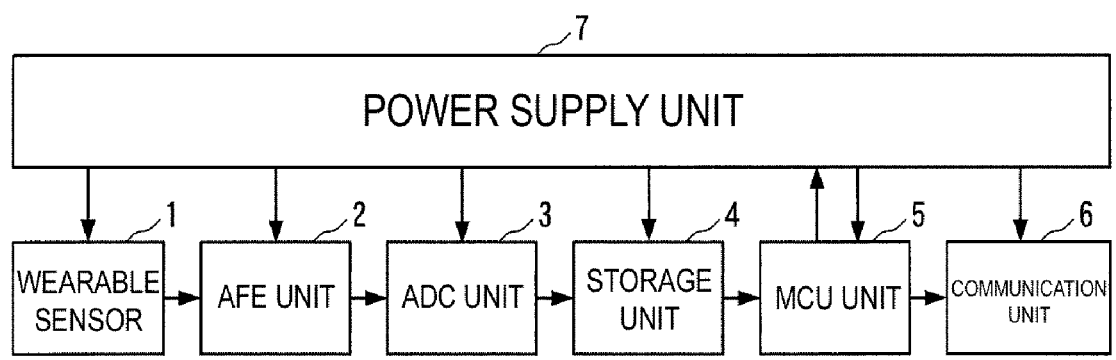
FIG. 1 is a block diagram illustrating a configuration of a perspiration analysis device according to an embodiment of the present invention.

Hereinafter, embodiments of the present invention will be described with reference to the drawings. FIG. 1 is a block diagram illustrating a configuration of a perspiration analysis device according to an embodiment of the present invention. The perspiration analysis device includes a wearable sensor 1, an analog front end (AFE) unit 2, an analog digital converter (ADC) unit 3, a storage unit 4, a micro control unit (MCU) 5, a communication unit 6, and a power supply unit 7.

The wearable sensor 1 detects an electric signal derived from perspiration secreted from a wearer's skin.

The AFE unit 2 is a circuit that includes an analog front end and amplifies a faint electric signal detected by the wearable sensor 1.

The ADC unit 3 is a circuit that includes an analog to digital converter and converts an analog signal amplified by the AFE unit 2 into digital data at a predetermined sampling frequency.

The storage unit 4 stores the digital data output by the ADC unit 3. The storage unit 4 is realized by a non-volatile memory represented by a flash memory, a volatile memory such as a dynamic random access memory (DRAM), or the like.

The MCU 5 is a circuit that performs signal processing for calculating an amount of perspiration and electrical resistivity of perspiration from the digital data stored in the storage unit 4.

Figure 2:
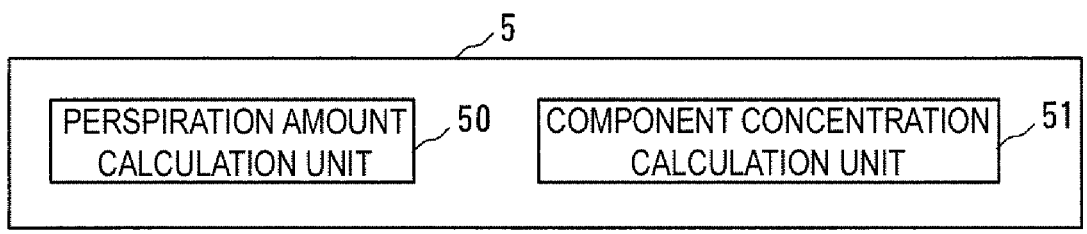
FIG. 2 is a functional block diagram of an MCU of the perspiration analysis device according to the embodiment of the present invention.

FIG. 2 is a functional block diagram of the MCU 5. The MCU 5 is a circuit that functions as a perspiration amount calculation unit 50 that calculates the amount of perspiration of the wearer based on light receiving characteristics of a photodiode of the wearable sensor 1, which will be described later, and a component concentration calculation unit 51 that calculates a concentration of an analysis target component in the perspiration of the wearer based on the light receiving characteristics of the photodiode of the wearable sensor 1.

The communication unit 6 includes a circuit that transmits measurement results and analysis results obtained by the MCU 5 to an external device (not illustrated) such as a smartphone in a wireless or wired manner. Examples of standards for wireless communication include Bluetooth (trade name) Low Energy (BLE) and the like. Further, examples of standards for wired communication include Ethernet (trade name) and the like.

The power supply unit 7 is a circuit responsible for supplying electric power to the perspiration analysis device.

Figure 3:
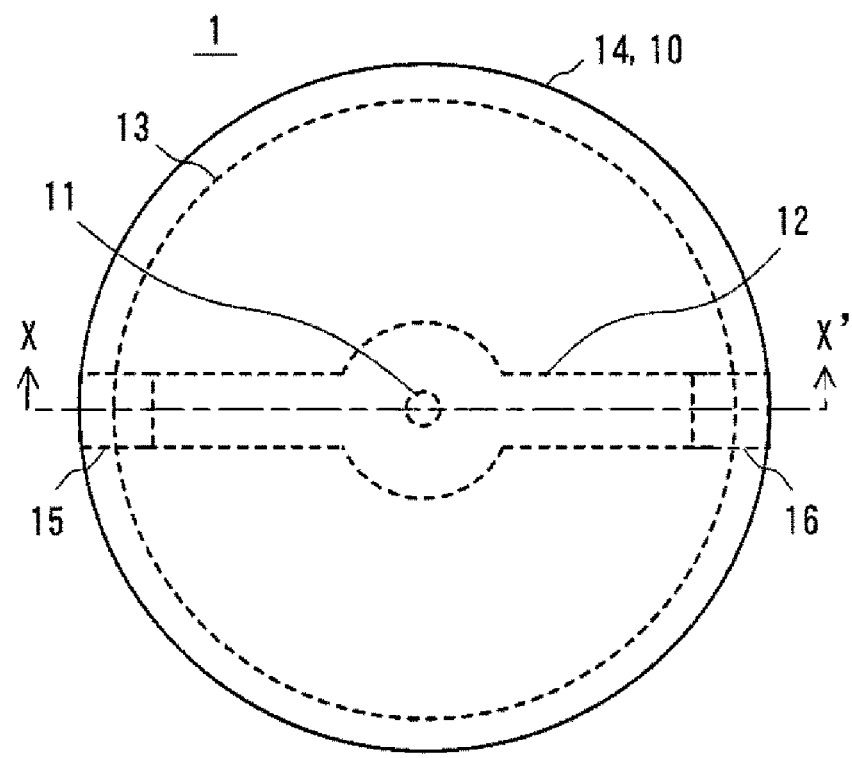
FIG. 3 is a plan view of a wearable sensor of the perspiration analysis device according to the embodiment of the present invention.
Figure 4:
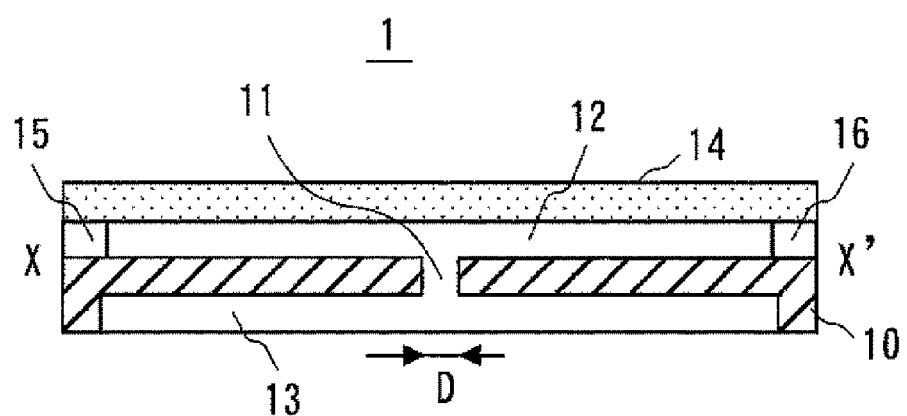
FIG. 4 is a cross-sectional view of the wearable sensor of the perspiration analysis device according to the embodiment of the present invention.

FIG. 3 is a plan view of the wearable sensor 1, and FIG. 4 is a cross-sectional view along line X-X' of FIG. 3. The wearable sensor 1 includes a base member 10, a water absorbing structure 14, a laser diode (LD) 15, and a photodiode (PD) 16. The base member 10 has a through hole 11 that serves as a flow path of liquid (perspiration), and a recess 12 that connects with an end portion of the through hole 11 on an outlet side thereof. The water absorbing structure 14 is disposed on a surface (upper surface) of the base member 10 on the outlet side to come into contact with the liquid flowing into the recess 12 from an opening of the through hole 11 on the outlet side. The laser diode (LD) 15 is disposed in the recess 12 to radiate light to a path in the recess 12 that passes through a position above the opening of the through hole 11 on the outlet side along the surface of the base member 10 on the outlet side. The photodiode (PD) 16 is disposed in the recess 12 to face the LD 15 with the position above the opening of the through hole 11 on the outlet side interposed therebetween, and receives light from the LD 15.

Examples of the base member 10 include, for example, a base member made of a hydrophilic glass material or a resin material. Also, the base member 10 may be a material subjected to a surface treatment for imparting hydrophilicity to a surface of a water repellent material and an inner surface of the through hole 11. A diameter D of the through hole 11 formed in the base member 10 is, for example, about 1 mm or less.

The recess 12 having a shape in which an upper surface thereof that is recessed is formed on the upper surface of the base member 10 to connect with the through hole 11. Conversely, a recess 13 having a shape in which a lower surface thereof that is recessed is formed on a lower surface of the base member 10 to connect with the through hole 11.

Also, in embodiments of the present invention, the recess 13 is not an essential constituent requirement. However, in a case in which the recess 13 is provided on a surface (lower surface) of the base member 10 on an inlet side thereof, perspiration can be collected from a wider area of the wearer's skin when the wearable sensor 1 is attached to the wearer's body such that the surface of the base member 10 on the inlet side faces the wearer's skin as described below.

Examples of the water absorbing structure 14 include fibers such as cotton or silk, a porous ceramic substrate, or the like. Also, the water absorbing structure 14 need not cover the opening of the through hole 11 on the outlet side and the entire surface of the recess 12 and may be disposed to come into contact with a droplet flowing into the recess 12 from the opening of the through hole 11 on the outlet side.

Figure 5:
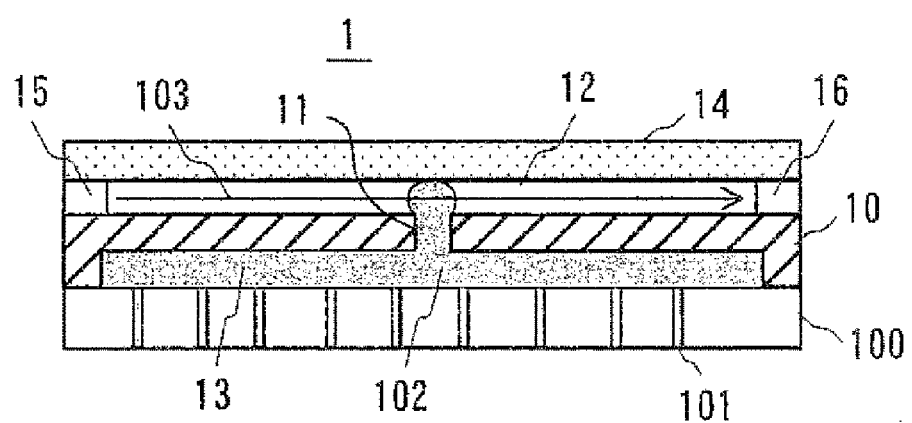
FIG. 5 is a cross-sectional view illustrating a state in which perspiration of a wearer flows into a through hole of the wearable sensor in the embodiment of the present invention.

As illustrated in FIG. 5, the wearable sensor 1 is attached to the wearer's body such that the lower surface of the base member 10 faces the wearer's skin 100. Reference numeral 101 of FIG. 5 is a perspiration gland of the wearer.

When the wearer perspires, perspiration 102 is introduced into the through hole 11 from inside the recess 13 of the base member 10 due to capillary action. Further, as the amount of perspiration increases, the perspiration 102 rises in the through hole 11 and reaches the recess 12 provided on the upper surface of the base member 10 to connect with the through hole 11 (FIG. 6).

The diameter D of the through hole 11, a length L of the through hole 11, and a hydrophilicity (wettability) of the inner wall of the through hole 11 are set such that the perspiration 102 reaches a position of the recess 12 due to capillary action.

Figure 6:
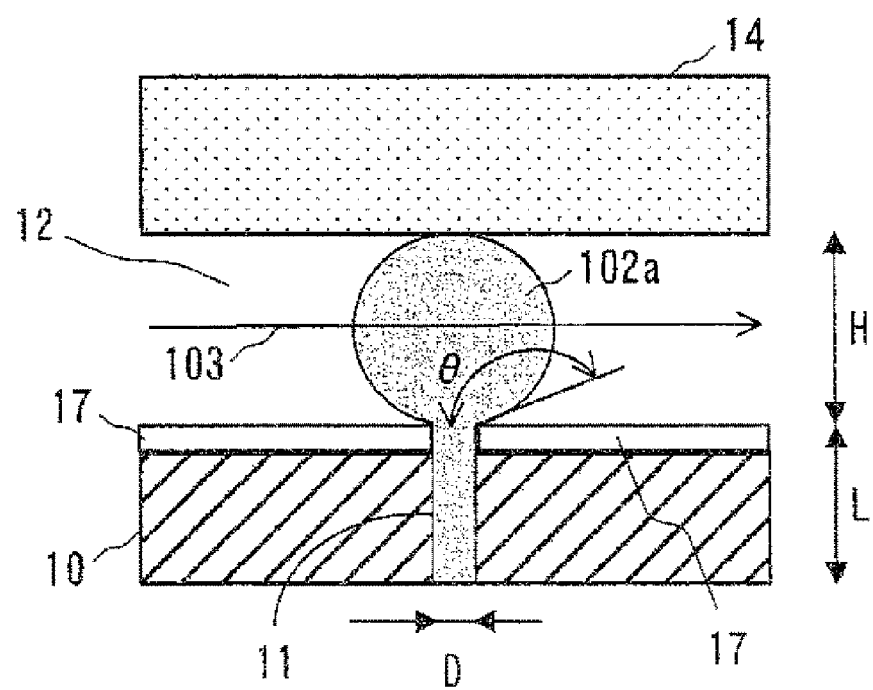
FIG. 6 is an enlarged cross-sectional view of FIG. 5.

As illustrated in the enlarged view of FIG. 6, a water repellent portion 17 is provided on an inner surface of the recess 12. In a case in which a hydrophilic material is used for the base member 10, the water repellent portion 17 is formed by applying a water repellent surface treatment to the inner surface of the recess 12. In a case in which a water repellent material is used for the base member 10, the water repellent portion 17 can be provided by leaving only the inner surface of the recess 12 as the water repellent material.

When the perspiration 102 reaches the recess 12, it becomes round due to surface tension of the perspiration itself, but its shape varies depending on a state of the recess 12. In the present embodiment, since the water repellent portion 17 is provided on the inner surface of the recess 12, the perspiration 102 reaching the recess 12 becomes a spherical droplet 102a as illustrated in FIG. 6. Further, when the amount of perspiration increases, the droplet 102a is increased in diameter and finally reaches the water absorbing structure 14.

The droplet 102a that has reached the water absorbing structure 14 evaporates while moving in the water absorbing structure 14 through a large number of holes in the water absorbing structure 14 due to capillary action. As a result, the droplet 102a disappears. A distance H between the water repellent portion 17 and the water absorbing structure 14 (a depth of the recess 12) is set to a value at which the droplet 102a flowing out of the through hole 11 can reach the water absorbing structure 14. A fineness of the holes of the water absorbing structure 14 and the hydrophilicity (wettability) of the water absorbing structure 14 are set such that the perspiration 102 diffuses to an area on a surface of the wearable sensor 1 opposite to the skin 100 due to capillary action.

At the time of measuring the amount of perspiration, as illustrated in FIGS. 5 and 6, the LD 15 that is a light emitting element radiates light to the path in the recess 12 passing through the position above the opening of the through hole 11 on the outlet side along the surface (upper surface) of the base member 10 on the outlet side.

The PD 16 that is a light receiving element receives the light from the LD 15.

Figure 7A:
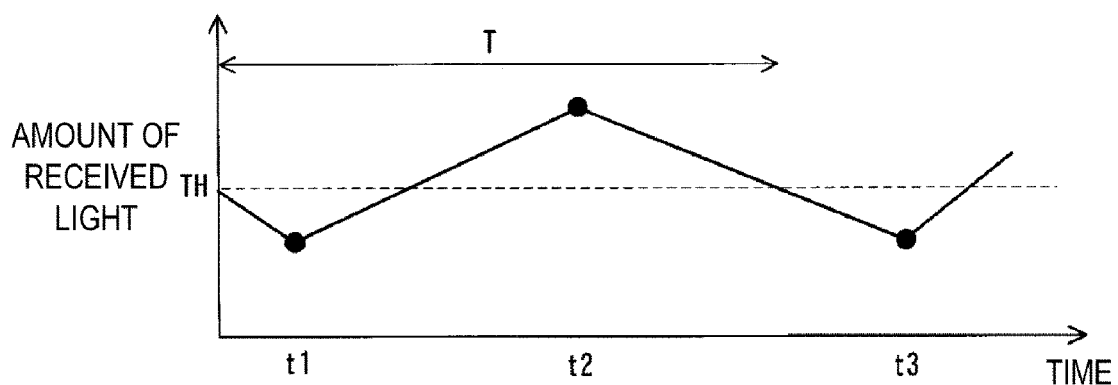
FIGS. 7A to 7D are diagrams illustrating an example of a change in an amount of received light incident on a photodiode from a laser diode.

FIG. 7A is a diagram illustrating an example of a change in an amount of received light incident from the LD 15 to the PD 16. Also, the change in the amount of received light in FIG. 7A is obtained by simplifying the amount of received light of the PD 16 and may differ from an actual amount of received light.

Figure 7B:
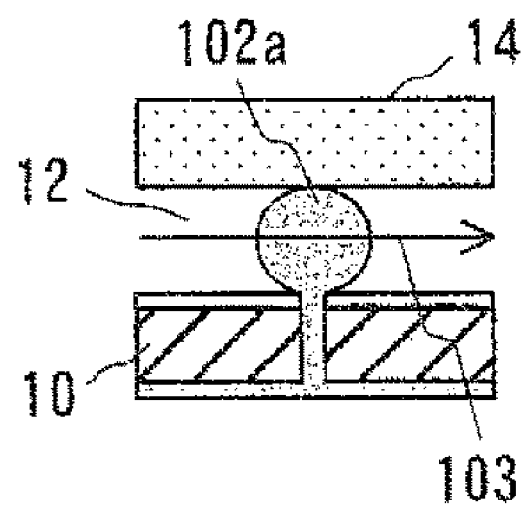
Figure 7C:
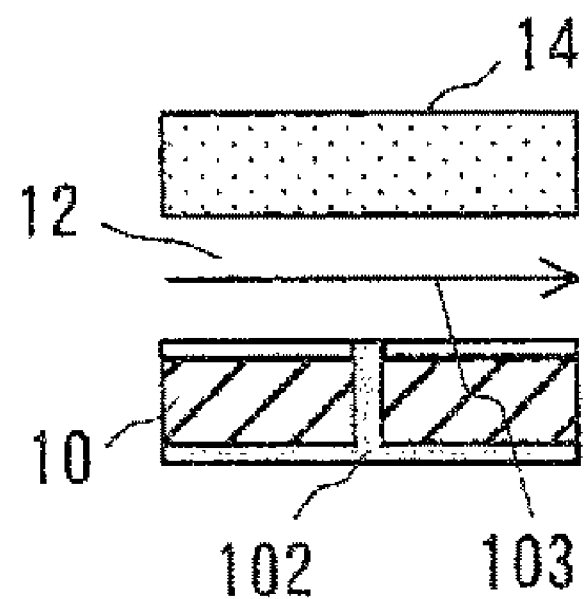
Figure 7D:
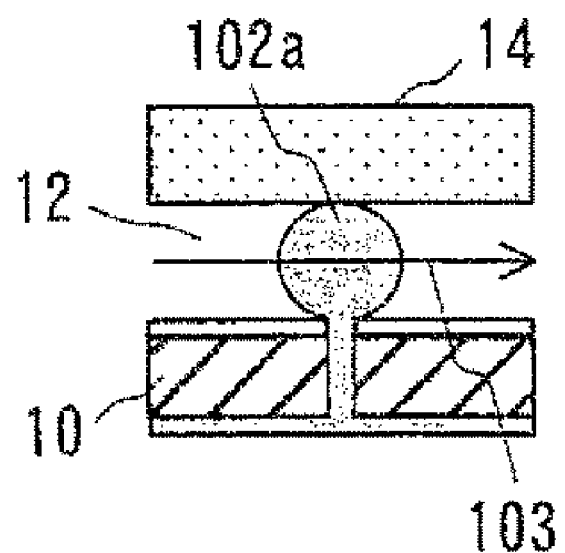

When the droplet 102a of the perspiration 102 is formed as illustrated in FIG. 7B at time t1, light 103 emitted from the LD 15 propagates in each medium in the order of the air in the recess 12, the droplet 102a, and the air in the recess 12, and is incident on the PD 16. When the droplet 102a disappears as illustrated in FIG. 7C at time t2, the light 103 propagates in the air in the recess 12 and is incident on the PD 16. When the droplet 102a is formed again as illustrated in FIG. 7D at time t3, the light 103 propagates in each medium in the order of the air in the recess 12, the droplet 102a, and the air in the recess 12, and is incident on the PD 16.

Thus, a difference in the medium in which the light 103 propagates is reflected in the amount of received light in the PD 16. Also, the arrangement of the LD 15 and the PD 16 are not limited to the present embodiment. It is only required that the LD 15 can radiate the light toward the droplet 102a that has flowed into the recess 12 from the opening of the through hole 11 on the outlet side, and the PD 16 can receive the light from the LD 15 that has passed through the droplet 102a.

Figure 8:
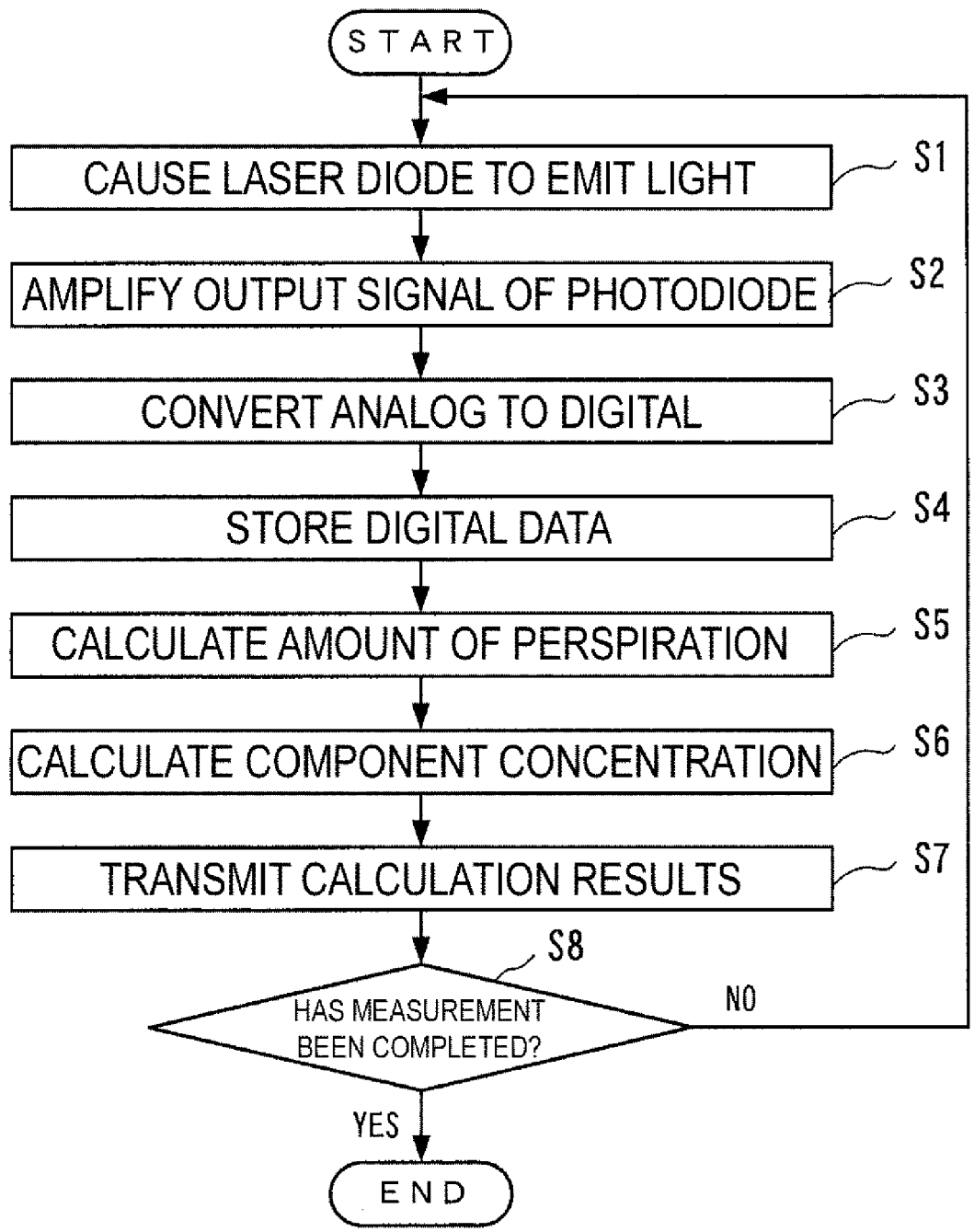
FIG. 8 is a flowchart for explaining an operation of the perspiration analysis device according to the embodiment of the present invention.

FIG. 8 is a flowchart for explaining an operation of the perspiration analysis device according to the present embodiment. The AFE unit 2 causes the LD 15 to emit light (step S1 in FIG. 8). Then, the AFE unit 2 amplifies an output signal (a photocurrent) of the PD 16 that has received the light from the LD 15 (step S2 in FIG. 8).

The ADC unit 3 converts the signal amplified by the AFE unit 2 into digital data (step S3 in FIG. 8). The digital data output from the ADC unit 3 is stored in the storage unit 4 (step S4 in FIG. 8).

The perspiration amount calculation unit 50 calculates the amount of perspiration of the wearer based on the amount of received light of the PD 16 indicated by the digital data stored in the storage unit 4 (step S5 in FIG. 8). Specifically, the perspiration amount calculation unit 50 sets, as the amount of perspiration, a value obtained by multiplying a volume V of the droplet 102a by the number of times the amount of received light of the PD 16 becomes equal to or less than a threshold TH. As illustrated in FIG. 7A, the threshold TH is set to a value lower than the amount of received light of the PD 16 (the amount of received light at time t2) when the light 103 emitted from the LD 15 propagates only in the air in the recess 12. This makes it possible to clearly distinguish the state of FIG. 7C from the states of FIGS. 7B and 7D.

The volume V of the droplet 102a can be calculated based on the known distance H between the water repellent portion 17 and the water absorbing structure 14, and an angle (a contact angle θ) formed between a surface of the droplet 102a and a surface of the water repellent portion 17. The contact angle θ can be estimated in advance based on a surface tension of the water repellent portion 17 and a surface tension of the perspiration. Since 99% of the perspiration is water, the surface tension of the perspiration is considered to be dominated by the physical properties of water, and the surface tension of water is defined as the surface tension of the perspiration.

Thus, the volume V of the droplet 102a can be estimated, and the amount of perspiration of the wearer can be estimated. Also, the perspiration amount calculation unit 50 may set, as the amount of perspiration, a value obtained by multiplying the volume V of the droplet 102a by the number of times the amount of received light of the PD 16 becomes a minimum value.

In addition, the perspiration amount calculation unit 50 can calculate a perspiration rate per unit area of the wearer by dividing the volume V of the droplet 102a by a period T (FIG. 7A) in which the amount of received light of the PD 16 becomes a value less than or equal to the threshold TH, and an area S (an area of the recess 13) of the wearer's skin 100 covered by the wearable sensor 1. Similarly to the above, the perspiration amount calculation unit 50 may calculate the perspiration rate per unit area of the wearer by dividing the volume V of the droplet 102a by the period in which the amount of received light of the PD 16 becomes the minimum value and the area S of the wearer's skin 100 covered by the wearable sensor 1.

Further, the component concentration calculation unit 51 calculates the concentration of the analysis target component in the perspiration of the wearer based on the amount of received light of the LD 16 (step S6 in FIG. 8). In the present embodiment, a laser wavelength of the LD 15 is set to an absorption wavelength of a specific component in the perspiration. As a result, the component concentration calculation unit 51 can calculate the concentration of the specific component based on the amount of received light of the LD 16 when it has become the minimum value.

The communication unit 6 transmits the calculation results of the perspiration amount calculation unit 50 and the calculation results of the component concentration calculation unit 51 to an external device (not illustrated) such as a smartphone (step S7 in FIG. 8).

The perspiration analysis device repeatedly performs the processing of steps S1 to S7 until, for example, there is an instruction for measurement completion from the wearer (YES in step S8 in FIG. 8).

As described above, according to the present embodiment, it is possible to realize the measurement of the amount of perspiration of the wearer using a wearable form. In the present embodiment, an air pump is not required, and thus a device can be made smaller than in the method disclosed in NPL 1.

Further, in the present embodiment, the light from the LD 15 that has passed through the droplet 102*a* is received by the PD 16, but the PD 16 may be disposed at a position at which it receives light reflected at an interface between the droplet 102*a* and the air when the droplet 102*a* is formed in the recess 12, and does not receive the light from the LD 15 when the droplet 102*a* is not present.

In this way, in the case in which the light reflected by the droplet 102*a* is received by the PD 16, the change in the amount of received light incident on the PD 16 differs from the characteristic illustrated in FIG. 7A. Specifically, when the droplet 102*a* is formed in the recess 12, the amount of received light will indicate the maximum value, and when the droplet 102*a* is not present, the amount of received light will indicate the minimum value. In this case, the threshold is set between the maximum value and the minimum value. The perspiration amount calculation unit 50 sets, as the amount of perspiration, the value obtained by multiplying the volume V of the droplet 102*a* by the number of times the amount of received light of the PD 16 becomes equal to or greater than the threshold. Also, the perspiration amount calculation unit 50 may set, as the amount of perspiration, the value obtained by multiplying the volume V of the droplet 102*a* by the number of times the amount of received light of the PD 16 reaches the maximum value. In addition, the perspiration amount calculation unit 50 can calculate the perspiration rate per unit area of the wearer by dividing the volume V of the droplet 102*a* by the period in which the amount of received light of the PD 16 becomes equal to or greater than the threshold (or the period in which the amount of received light becomes the maximum value), and the area S of the wearer's skin 100 covered by the wearable sensor 1.

Figure 9:
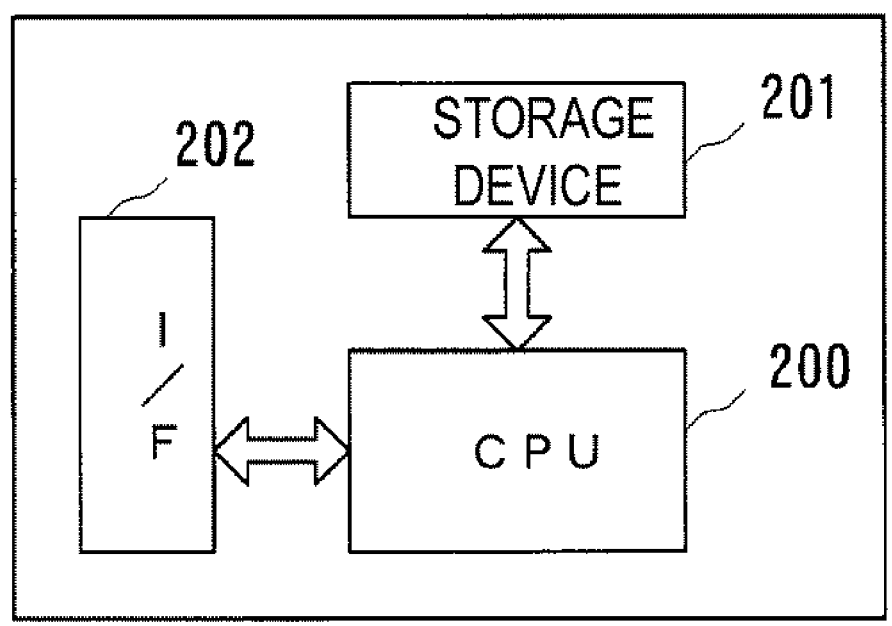
FIG. 9 is a block diagram illustrating a configuration example of a computer that realizes the perspiration analysis device according to the embodiment of the present invention.

The storage unit 4 and the MCU 5 described in the present embodiment can each be realized by a computer including a central processing unit (CPU), a storage device, and an interface, and programs for controlling these hardware resources. A configuration example of this computer is illustrated in FIG. 9. The computer includes a CPU 200, a storage device 201, and an interface device (hereinafter simply referred to as I/F) 202. The ADC unit 3, the communication unit 6, the power supply unit 7, and the like are connected to the I/F 202. In such a computer, a program for realizing the perspiration analysis method of embodiments of the present invention is stored in the storage device 201. The CPU 200 executes the processing described in the present embodiment in accordance with the program stored in the storage device 201.

INDUSTRIAL APPLICABILITY

Embodiments of the present invention can be applied to a technique for analyzing an amount of perspiration.

REFERENCE SIGNS LIST

1 Wearable sensor
2 AFE unit
3 ADC unit
4 Storage unit
5 MCU
6 Communication unit
7 Power supply unit
10 Base member
11 Through hole
12,13 Recess
14 Water absorbing structure
15 Laser diode
16 Photodiode
17 Water repellent portion
50 Perspiration amount calculation unit
51 Component concentration calculation unit.

The invention claimed is:

1. A perspiration analysis device, comprising:
a wearable sensor comprising:
a base member that includes a through hole serving as a flow path of liquid and a first recess connected to a first end portion of the through hole;
a water absorbing structure disposed on a first surface of the base member to come into contact with the liquid flowing into the first recess from a first opening of the through hole on the first end portion;
a light emitting element configured to radiate light toward the liquid flowing into the first recess from the first opening of the through hole,
wherein a second end portion of the through hole is disposed on a side of the base member facing a skin of a wearer when the base member is attached to a body of the wearer;
and a light receiving element configured to receive light emitted from the light emitting element;
and wherein the received light is one of (1) transmitted through the liquid, or (2) reflected by the liquid;
and a perspiration amount calculation device configured to calculate an amount of perspiration of the wearer of the wearable sensor based on characteristics of the light received by the light receiving element,
wherein in a case in which the light receiving element receives the light transmitted through the liquid, the perspiration amount calculation device is configured to set, as the amount of perspiration, a value obtained by multiplying a presumed volume of a droplet of the liquid flowing from the through hole into the first recess by a number of times an amount of received light of the light receiving element is equal to or less than a threshold or the number of times the amount of received light is a minimum value, and in a case in which the light receiving element receives the light reflected by the liquid, the perspiration amount calculation device, as the amount of perspiration, a value obtained by multiplying the presumed volume of the droplet of the liquid flowing from the through hole into the first recess by the number of times the amount of received light of the light receiving element is equal to or greater than the threshold or the number of times the amount of received light is a maximum value.

2. A perspiration analysis method, comprising:

providing a wearable sensor, the wearable sensor comprising:

a base member that includes a through hole serving as a flow path of a liquid and a first recess connected to a first end portion of the through hole;

and a water absorbing structure disposed on a first surface of the base member to come into contact with the liquid flowing into the first recess from a first opening of the through hole on the first end portion;

radiating light from the light emitting element toward the perspiration flowing into the first recess from the first opening of the through hole when the wearable sensor is attached to a body of a wearer;

receiving light emitted from the light emitting element;

and wherein the received light is one of (1) transmitted through the liquid, or (2) reflected by the liquid;

and calculating an amount of perspiration of the wearer of the wearable sensor based on characteristics of light received by the light receiving element wherein the calculating includes:

setting in a case in which the light receiving element receives the light transmitted through the liquid, as the amount of perspiration, a value obtained by multiplying a presumed volume of a droplet of the liquid flowing from the through hole into the first recess by a number of times an amount of received light of the light receiving element is equal to or less than a threshold or the number of times the amount of received light is a minimum value, and:

setting in a case in which the light receiving element receives the light reflected by the liquid, as the amount of perspiration, a value obtained by multiplying the presumed volume of the droplet of the liquid flowing from the through hole into the first recess by the number of times the amount of received light of the light receiving element is equal to or greater than the threshold or the number of times the amount of received light is a maximum value.

3. The perspiration analysis method according to claim 2, wherein a second surface of the base member on which a second end portion of the through hole is disposed is hydrophilic, and an inner surface of the through hole is hydrophilic, and wherein an inner surface of the first recess is water repellent.

4. The perspiration analysis method according to claim 2, wherein the base member further includes a second recess on a second surface of the base member on which a second end portion of the through hole is disposed, and wherein the second recess is connected to the second end portion of the through hole.

* * * * *